May 5, 1936.  J. F. CARTER  2,039,881
POWER UNIT FOR INDIVIDUAL LUBRICANT GUNS
Filed July 2, 1934  2 Sheets-Sheet 1
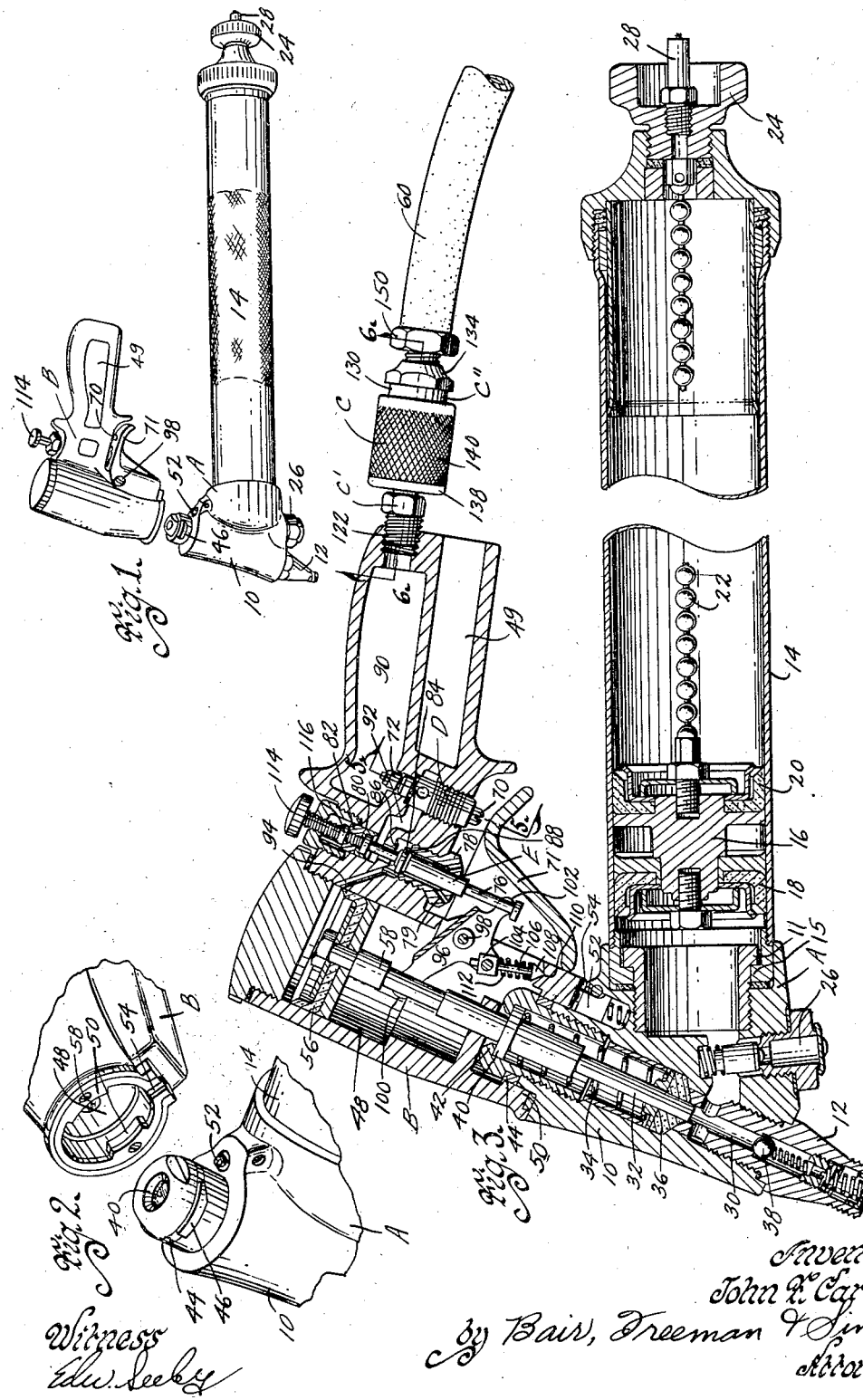

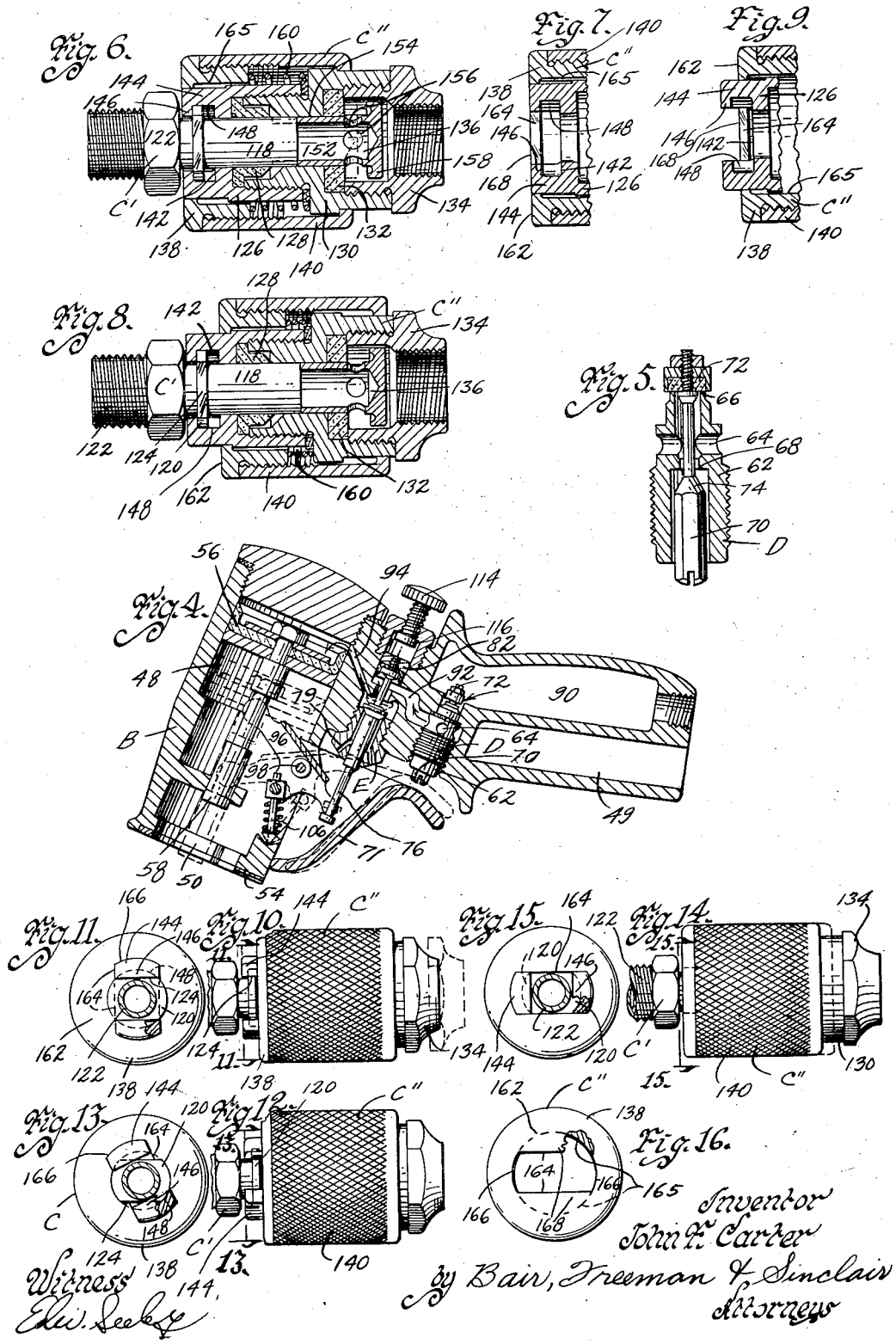

Patented May 5, 1936

2,039,881

UNITED STATES PATENT OFFICE 2,039,881

POWER UNIT FOR INDIVIDUAL LUBRICANT GUNS

John F. Carter, Bryan, Ohio, assignor to The Aro Equipment Corporation, Bryan, Ohio, a corporation of Ohio Application July 2, 1934, Serial No. 733,448

13 Claims. (Cl. 221—47.3)

An object of my invention is to provide a single power unit, incorporating simple, durable and inexpensive means to operate either continuously or one shot at a time, the power unit being usable in connection with a plurality of individual guns each having a different type of lubricant therein.

A further object is to provide in connection with a lubricant gun having a supply of lubricant therein, a power operating means for the gun which is quickly detachable therefrom so that it can be attached to another lubricant gun for the same purpose and one power unit will thus serve several different guns.

More particularly it is my object to provide in connection with a lubricant gun, a detachable power unit which has a cylinder, a piston therein, a pair of valves for controlling the flow of fluid pressure, such as compressed air, to the cylinder to selectively secure either one operation or many, a speed coupler connection being provided between the power unit and the source of fluid pressure for operating it, the lubricant gun having a lubricant expeller plunger engaged by the piston of the power unit whereby movement of the piston will expel lubricant from the lubricant gun.

Specialized lubrication is quite essential in connection with greasing of automobiles and the like. By specialized lubrication I have reference to an arrangement wherein a plurality of different grease dispensing guns are employed, each adapted to contain a different grease or lubricant and each adapted to be used upon a different part of an automobile or the like so that the proper grease may be used upon the several parts of the automobile for securing the greatest amount of efficiency of lubrication. To this end there are now in use racks, platforms and supporting boards of all kinds, each adapted to support a plurality of grease dispensing devices or guns. These guns include a supply of lubricant, depending upon the nature of the gun and the kind of work it is to do—that is, as to greasing.

It is my object to associate with a plurality of different guns, one common operating means therefor. It is desirable to secure power actuation for the various grease guns and it is my object to provide a power unit in association with the plurality of grease dispensing guns, which power unit may be temporarily, selectively and quickly mounted upon any one of the plurality of grease dispensing guns for discharging grease through the gun then associated with the power unit and can be quickly detached from a gun when desired.

The power unit includes a selectively operable means to secure either one or a series of operations when the control trigger of the power unit is depressed.

Still a further object is to provide a speed coupler which can be readily coupled by a mere telescoping and twisting action and likewise uncoupled so that an air line can be quickly associated with the power unit or disassociated therefrom without the leakage of any air or the necessity of turning off a valve in the air supply line.

Still a further object is to provide a trigger for operating a power unit which serves as a guard for projecting elements of the unit.

With these and other objects in view my invention consists in the construction, arrangement and combination of the various parts of my device, whereby the objects contemplated are attained, as hereinafter more fully set forth, pointed out in my claims and illustrated in the accompanying drawings, in which:

Figure 1 is a perspective view of a lubricant gun and a power unit embodying my invention, showing them separated from each other.

Figure 2 is an enlarged perspective view of the coacting parts of the gun and unit.

Figure 3 is an enlarged longitudinal sectional view through the power unit and lubricant gun.

Figure 4 is a similar sectional view through the power unit, showing it detached from the lubricant gun and showing the parts in a different position.

Figure 5 is an enlarged sectional view on the line 5—5 of Figure 3, showing a control valve.

Figure 6 is an enlarged sectional view on the line 6—6 of Figure 3, showing a speed coupler in coupled position.

Figure 7 is a sectional view similar to a portion of Figure 6, parts being omitted.

Figure 8 is a view similar to Figure 6, showing the parts in a different position as when they are partially uncoupled.

Figure 9 is a view similar to a portion of Figure 8, showing parts omitted.

Figure 10 is a side elevation showing the first step in the coupling operation.

Figure 11 is a sectional view on the line 11—11 of Figure 10.

Figure 12 is a side elevation similar to Figure 10, showing the second step of the coupling operation.

Figure 13 is a sectional view on the line 13—13 of Figure 12.

Figure 14 is a side elevation similar to Figure 10, showing the third step in the coupling operation.

Figure 15 is a sectional view on the line 15—15 of Figure 14; and

Figure 16 is a view similar to Figure 15, except omitting parts thereof.

On the accompanying drawings I have used the reference character A to indicate generally a lubricant gun unit and B a power unit. The lubricant gun unit A comprises briefly a head 10, a discharge nozzle 12 and a lubricant supply reservoir or cylinder 14.

One use for which my invention is adapted is in connection with a "hand gun board" usually mounted in a vertical position in a lubricant service station and having a plurality of lubricant gun units, one for each type and grade of lubricant used, supported thereon by hooks or the like. Heretofore such lubricant guns have been entirely operated by hand and it is my purpose to provide a single power unit which may also be supported on the hand gun board when not in use for detachable connection with any one of the lubricant gun units, so that lubricant may be expelled therefrom by power imparted thereto by the power unit.

I will now describe the lubricant gun unit, the power unit and the speed coupler which I use in connection therewith specifically.

Within the reservoir 14 I provide a lubricant expeller 16 having a lubricant piston 18 and a compressed air piston 20. The expeller 16 is adapted to be withdrawn toward the right by a chain 22 and a knob 24 when it is desired to fill the reservoir 14 with lubricant. The reservoir may be detached from the head 10 for this operation or the lubricant may be drawn or forced in through a filler valve 26 in the head 10.

After the reservoir has been filled with lubricant and properly associated with the head 10, the knob 24 can be screwed into position and compressed air may be introduced through a fitting 28 in the knob 24 for placing the contents of the reservoir 14 under pressure by tending to force the piston 20 toward the left. The fitting 28 includes an ordinary check valve such as the type used in tire valves of automobiles.

The head 10 includes a lubricant cylinder 30 in the nozzle 12, a plunger 32 for forcing lubricant under pressure from the nozzle and a spring 34 operable to return the plunger after an expelling operation. Suitable packing is provided at 36 for the plunger and it is retained tight by the spring 34.

A check valve 38 is mounted in the nozzle 12 to prevent drawing lubricant back into the cylinder 30 upon the return of the plunger 32.

The plunger 32 has an enlarged head 40 which normally rests against a flange 42 of a retainer sleeve. The sleeve 42 retains a washer 44 having bayonet lugs 46.

The power unit B comprises a cylinder 48 having at its forward end bayonet lugs 50 which coact with the lugs 46. Thus by a telescoping and slightly oscillating operation of the parts, best shown in Figure 2, the power unit may be quickly associated with or detached from the lubricant gun unit.

After such association the parts are prevented from accidental disassociation by means of a spring plunger 52, of the lubricant gun unit, engaging a notch 54 of the power unit.

The power unit includes a piston 56 in the cylinder 48 and a piston rod 58. An air hose 60 is adapted to supply compressed air or other fluid pressure to the power unit through a speed coupler C, a manual control valve D and an automatic valve E.

The manual control valve D comprises a sleeve 62 (see Figure 5) having ports 64, an intake valve seat 66 and an exhaust valve seat 68. A valve pin 70 is reciprocable in the sleeve and provided with an intake valve head 72 and an exhaust valve head 74 cooperable with the seats 66 and 68 respectively.

The automatic valve E comprises a stem 76 reciprocable in a sleeve 78 and in a cylinder 80. The part in the cylinder 80, indicated at 82, includes a cup leather for sealing purposes.

The stem 76 has a valve head 84 cooperable with either an intake seat 86 or an exhaust seat 88. Passageways 90, 92 and 94 connect the speed coupler C with the seat 66, the port 64 with the seat 86, and the space between the seats 86 and 88 with the cylinder 48 respectively.

For oscillating the automatic valve E, I provide a toggle lever arrangement consisting of a lever 96 pivoted at 98 and having ends 100 and 102 for engagement and coaction with shoulders on the piston rod 58 and the valve pin 76 respectively. An over-center spring mechanism consisting of a block 104 pivoted to the lever 96, a pin 106 slidable through the block and having a head 108 pivotally contacting with a seat 110 of the power unit B and a spring 112 interposed between the block and the head, is associated with the toggle lever 96.

Means is provided for locking the valve stem 76 in one position and against reciprocating operation. Such means consists of a thumb screw 114 screw threadedly associated with the body of the power unit, the inner end having a head 116 adapted to contact with the portion 82 of the automatic valve E, as in Figure 3. The other adjustment for the automatic valve is shown in Figure 4 wherein the head 116 prevents entire disconnection of the thumb screw 114 from the power unit. For manually controlling the valve D, I provide a trigger 71. It is pivoted on the pin 98 which thereby serves as a pivot for both of the elements 71 and 96. The trigger is channel shaped in cross section so as to enclose the projecting stem 76 of the automatic valve E and the toggle lever 96, thus serving as a guard for them to prevent damage thereof or interference with their operation.

The speed coupler C comprises a fitting C' and a fitting C''. The fitting C'' has a sleeve portion 118, projections 120 and a threaded end 122. The end 122 is illustrated, however, as a male coupling member but can be either a female type or some other appropriate type for fluid pressure operated units or other devices with which it is to be associated. The projections 120 are shown on the drawings as being formed by cutting flat spots 124 on a circular disc-like flange extending from the sleeve 118.

The fitting C'' comprises an inner element consisting of parts 126, 128, 130, 132, 134 and 136 and an outer element comprising parts 138 and 140. The part 126 has an outer face 142 from which a pair of projections 144 extend. Each projection 144 has a segment shaped flange 146, between which and the face 142 it has a dished socket 148.

The part 128 is made of leather or the like and acts as a sealing ring, it being confined between the parts 126 and 130, which are screw threaded together as best shown in Figure 6. The part 132 is a valve seat and it is confined in the part 130 by the part 134, these two being screw threaded together. The part 134 is screw threaded or otherwise arranged to coact with the hose 60, a connector fitting 150 being shown in Figure 3 for this purpose.

The part 136 is a valve consisting of a sleeve 152 reciprocable in a bore 154 of the part 130 and in the bore of the valve seat 132. The sleeve is perforated as at 156 for the passage of fluid pressure. The valve 136 has a cupped disc-like head 158 for coaction at times with the valve seat 132.

The parts 138 and 140 are screw threadedly assembled relative to each other and are normally constrained to an extended position by a spring 160 interposed between them. The part 138 has a face 162 having therein an elongated opening provided with straight sides 164 and curved ends 166, the ends of the opening receiving the projections 144 from the face 142 of the part 126. The projections 144 always remain in the slot defined by the sides and ends 164 and 166, although they may project more or less as shown in Figures 7 and 9, Figure 7 showing the flanges 146 of the projections 144 aligned with flanges 168 of the part 138. The flanges 168 are segment shaped as shown in Figure 16, from which the fitting C' and the member 26 with its projections 144 have been omitted. The outer edges of these flanges join the part 138 at its bore 165.

Practical operation

In the operation of my device, a plurality of the lubricant gun units A may each be filled with a different type or grade of lubricant. Filling may be accomplished by unscrewing the knob 24 to release the air from behind the piston 20 and then disconnecting the reservoir 14 from the head 10, a bayonet joint (forming no part of my present invention) being provided between the two, the bayonet lugs being indicated at 15 and 11, respectively. The open end of the reservoir 14 may then be thrust into a supply container of lubricant and the knob 24 may then be pulled rearwardly whereupon the chain 22 will pull the expeller 16 rearwardly for drawing the lubricant into the reservoir. The chain 22 may then be collapsed and the knob 24 re-assembled with respect to the reservoir, whereupon the reservoir may be re-assembled with respect to the head 10. Air may then be introduced through the fitting 28 from an air chuck or from the coupler C, either of which being held on the fitting by the operator.

Instead of removing the reservoir, the air may be released by unscrewing the knob 24 and the filler valve 26 may then be associated with a supply of lubricant under pressure, which forces lubricant into the reservoir and forces the expeller 16 rearwardly.

The knob 24 may then be screwed in again and air applied through the valve 28 for placing the contents of the reservoir under pressure to force it toward the nozzle 12.

The power unit B can then be associated with the lubricant gun unit A by placing the cylinder 48 over the flange 42 of the grease gun head 10 with the lugs 46 and 50 out of alignment. The power unit may then be rotated to a position where the lugs are in alignment, whereupon the pin 52 will snap into the groove 54 to prevent subsequent accidental dislodgment of the power unit from the lubricant gun unit.

When it is desirable to release the power unit from the gun unit, the handle 49 may be struck a blow with the heel of the hand to force the notch 54 past the pin 52 whereupon the lugs 50 can be disengaged from the lugs 46.

The nozzle 12 may have asociated with it any type of fitting adaptable for the grease reception fitting on which the gun is to be used. To operate the lubricant gun with the thumb screw 114 adjusted as in Figure 3, the trigger 71 may be depressed, whereupon the valve stem 70 will move to the opposite position from that shown in Figure 5, closing the valve seat 68 and opening the valve seat 66.

Air will then pass from the passageway 90 through the valve seat 66 and the port 64 to the passageway 92, then through the seat 86 and the passageway 94 to the cylinder 48 behind the piston 56 therein. This will force the piston 56 downwardly and the piston rod 58 will force the plunger 32 downwardly for forcing a charge of lubricant under high pressure through the check valve 38 and the nozzle 12 to the grease reception fitting.

When the trigger 71 is released, the valve D will assume the position shown in Figure 5, whereupon the spring 34 will return the plunger 32 and the piston 56 forcing the air behind it out through the passageways 94 and 92, the ports 64 and the seat 68 to atmosphere between the sleeve 62 and the pin 70 of the valve D. Thus a single shot of lubricant is discharged each time the trigger 71 is depressed and released.

To secure a number of rapid reciprocations of the piston 56 whenever the trigger 71 is depressed, the thumb screw 114 may be adjusted to the position shown in Figure 4, whereupon the air or other fluid pressure, when admitted by opening the valve D, will force the piston 56 forward in the same manner, but when the piston reaches its lower limit of movement as shown by dotted lines, the toggle lever 96 will trip to the dotted line position and change the automatic valve E so that the valve head 84 will contact with the seat 86 rather than the seat 88.

Thereupon the air behind the piston 56 will be exhausted through the passageway 94 past the seat 88 and out through exhaust ports 79 in the sleeve 78 of the valve E. When the piston assumes its upper position, the valve E will be again tripped to the full line position of Figure 4 to restart the cycle of operation and these cycles will continue until the trigger 71 is released. Thus the power unit can be caused by a simple adjustment to operate either single or multishot.

The speed coupler C operates as follows. When the fittings C' and C" are disassociated, they may be quickly associated with each other in an air tight manner by grasping the hose 60 or the fitting 150 and telescoping the fitting C' over the sleeve 118 with the inner edges of the flanges 146 aligned with the flat spots 124 of the projections or flange 120 as in Figures 10 and 11.

The fitting C" will first be in the dotted line position of Figure 10 and then as the fitting 150 is pushed toward the fitting C', the projections 120 will prevent further movement of the outer element of the fitting C" consisting of the parts 138 and 140, but the inner element consisting of the parts 126, 130 and 134 will be pushed further toward the fitting C' to the full line position of Figure 10.

This will cause the projections 144 to project to a position with the flanges 146 thereof beyond the projections 120 of the fitting C' and out of alinement with the flanges 168 as in Figure 9.

The fitting C'' may then be rotated a quarter turn, first assuming the partially rotated position of Figures 12 and 13 and then the fully rotated position of Figures 14 and 15. In Figures 12 and 13, the flanges 146 partially retain the projections 120, while in Figures 14 and 15, they fully retain the projections and since the sides 164 of the slot in the face 162 of the outer element of the fitting C'' align with the flat spots 124 of the flange 120, the spring 160 within the fitting C'' will expand, causing the outer element of the fitting to move from the dotted position of Figure 14 to the full line position. The flanges 168 of the outer element of the fitting C'' will then become aligned with the flanges 146 of the inner element, as in Figure 7, so as to form a complete annular retaining flange for the projections 120 whereby the fittings C' and C'' can be rotated relative to each other without any possibility of them becoming accidentally separated.

During the association of the fitting C' with the fitting C'', the sleeve 118 first passes through the cup leather 128 to prevent any leakage when the air pressure finally is admitted to the cup leather and contracts it against the sleeve 118.

Thereafter, the inner end of the sleeve engages the sleeve 152 of the valve 136 for forcing the head 158 thereof away from the seat 132 so that air from the part 134 may pass through the ports 156 to the sleeve 118.

For disconnecting the speed coupler C from the power unit, the periphery of the element C'' is grasped by the operator and the coupler is rotated in either direction and at the same time pulled rearwardly so that when the sides 164 of the slot in the outer end of the fitting C'' align with the flat spots 124 of the flange 120, the outer element may be pulled rearwardly from the full line position of Figure 14 to the dotted line position thereof.

Thereafter the fitting C'' may be rotated a quarter turn to first assume the position of Figures 12 and 13 and then the position of Figures 10 and 11, the fitting still being pulled rearwardly. As soon as the position of Figures 10 and 11 is assumed, the fitting C'' will be pulled off the fitting C' as the flanges 146 in this position do not retain the projections 120.

Thus by a simple pushing and twisting operation, the supply hose 60 may be coupled to the power unit, while by a simple pulling and twisting motion, it may be uncoupled, either operation taking but a few seconds time.

During the uncoupling operation, the valve 136 of the fitting C'' will first be seated before the sleeve 118 is pulled out of the cup leather 128 so that the supply of air is automatically shut off without the necessity of manually closing a valve in the supply line 60.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. A power unit for use with a plurality of individual lubricant guns each having a lubricant expeller plunger, said power unit being detachable and selectively connectible with any one of said lubricant guns for exerting power on the lubricant expeller plunger thereof and comprising a piston engageable with said plunger and selective means for controlling the supply of fluid pressure to secure either a single impulse at a time or a continuation of impulses of said piston.

2. In a device of the class described, a lubricant gun comprising a discharge nozzle, a cylinder and a lubricant expeller plunger for expelling lubricant from said cylinder in combination with a power unit for said lubricant gun detachably connected therewith and comprising a cylinder, a piston therein for engagement with said lubricant expeller plunger and selective means to control the flow of fluid pressure to said last mentioned cylinder for moving said power unit one reciprocation at a time or a series of reciprocations at a time.

3. A power unit for selective association with a plurality of portable lubricant guns, each gun being complete for the discharge of lubricant therefrom except for power means to dispense lubricant from said guns, said power unit including selectively operable means to cause either single or multi-shot operation and being adaptable for connection with any one of the lubricant guns and serving, when connected, as the power means for dispensing lubricant from said lubricant guns and remaining free of the lubricant at all times.

4. A power unit adapted to be interchangeably connected with lubricating guns having lubricant expeller plungers, said power unit having motivating means therein arranged to actuate said plungers when connected with the guns and having a selectively operable control to cause either single or multi-shot operation of the motivating means and a handle portion on said power unit for permitting the lubricant gun and power unit to be handled as a single portable grease dispensing device.

5. A power unit adapted to be interchangeably connected with lubricating guns having lubricant expeller plungers, said power unit having motivating means therein for operating said expeller plungers whereby the power unit may be employed for dispensing lubricant of different guns to different parts of a device to be lubricated and a manual control for the motivating means for said power unit including a control device to cause either a single or automatically a number of operations of the motivating means upon a single cycle of movement of the manual control.

6. A power unit adapted to be interchangeably connected with portable lubricant guns having dispenser nozzles and lubricant reservoirs, means for detachably connecting said power unit with said lubricant guns and said power unit having motivating means therein for operating said guns for discharging lubricant from the guns and also having selectively operable means to cause either a single or an undetermined number of operations of the motivating means.

7. In a lubricant dispensing device, the combination of a power unit and a quick detachable pumping unit, said pumping unit comprising a cylinder and a plunger, means in one unit for forcing the plunger in one direction, means in the other unit for forcing the plunger in the opposite direction, the parting line of the two units lying between the two means and means in the power unit for causing either single or multi-shot operation thereof.

8. In an apparatus of the class described, a single power unit including a power driven member, adapted to be interchangeably connected with individual lubricant guns adapted to have different lubricants contained therein, said guns having expeller plungers acting upon the lubricant contained in said guns to force lubricant under pressure therefrom, said power unit, through said power driven member, moving said expeller plungers and means for admitting fluid pressure to said power driven member comprising a manual control valve for controlling the supply of lubricant pressure and an automatic valve for intermittently admitting compressed air to the power driven member and exhausting air therefrom, means for locking said automatic valve against operation, said control valve when released permitting the exhaust of air from said power driven mechanism.

9. In a device of the class described, a lubricant gun comprising a discharge nozzle, a lubricant expeller plunger therein, a reservoir cylinder, a follower piston therein, and means for admitting compressed air to said cylinder to move said follower piston toward said discharge nozzle in combination with a power unit for said lubricant gun detachably connected therewith and comprising a power moved member engageable with said lubricant expeller plunger and selective control means for securing either a single or a number of operations of said power moved member.

10. A fluid pressure operated power unit comprising a movable member, movable in one direction by the introduction of fluid pressure thereto, means to return said movable member and control means comprising a manual control valve and an automatic valve, said automatic valve being operable to intermittently admit fluid pressure to said control member and exhaust fluid pressure therefrom, locking means for preventing operation of said automatic valve, said control valve upon being released exhausting air from said movable member.

11. In a device of the class described, a lubricant gun and a power unit therefor, said power unit comprising a cylinder, a piston therein for operating said lubricant gun, a control valve for admitting actuating fluid to and exhausting it from said cylinder, said control valve having a projecting part, operating elements for said control valve connected with said piston to thereby be shifted at the ends of the strokes thereof, and a trigger for controlling the flow of actuating fluid to said control valve, said trigger being channel shaped in cross section and enclosing said projecting part and operating elements.

12. In a device of the class described, a lubricant gun and a power unit therefor, said power unit comprising a cylinder, a piston therein for operating said lubricant gun, a control valve for admitting actuating fluid to and exhausting it from said cylinder, said control valve having a projecting part, operating elements for said control valve connected with said piston to thereby be shifted at the ends of the strokes thereof, a fluid admission valve between a source of fluid pressure and said control valve and a trigger for operating said fluid admission valve, said trigger being channel shaped in cross section and enclosing said projecting part and operating elements.

13. In a device of the class described, a lubricant gun and a power unit therefor, said power unit comprising a cylinder, a piston therein for operating said lubricant gun, a control valve for admitting actuating fluid to and exhausting it from said cylinder, said control valve having a projecting part, operating elements for said control valve, connected with said piston to thereby be shifted at the ends of the strokes thereof a pivot pin for one of said elements and a trigger pivoted on said pivot pin for controlling the flow of actuating fluid to said control valve, said trigger being channel shaped in cross section and enclosing said projecting part and operating elements.

JOHN F. CARTER.